United States Patent
Gross et al.

(10) Patent No.: US 7,272,925 B2
(45) Date of Patent: Sep. 25, 2007

(54) $NO_x$ REDUCTION IN LEAN BURN ENGINE EXHAUST

(75) Inventors: Kenneth B. Gross, Troy, MI (US); Steven J. Schmieg, Troy, MI (US); Byong K. Cho, Rochester Hills, MI (US); Jerome P. Ortmann, Sterling Heights, MI (US); Daniel Dziedzic, Rochester Hills, MI (US); Thomas J. Chapaton, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/257,760

(22) Filed: Oct. 25, 2005

(65) Prior Publication Data

US 2007/0089404 A1 Apr. 26, 2007

(51) Int. Cl.
*F01N 3/00* (2006.01)
(52) U.S. Cl. .................. 60/286; 60/274; 60/275; 60/301; 60/303; 422/186.07; 422/186.3; 204/164; 204/177
(58) Field of Classification Search ............ 60/274, 60/275, 286, 295, 301, 303; 422/186.04, 422/186.07, 186.3; 204/164, 177, 179
See application file for complete search history.

(56) References Cited

U.S. PATENT DOCUMENTS

| | | | |
|---|---|---|---|
| 5,893,267 A * | 4/1999 | Vogtlin et al. ............. | 60/274 |
| 6,345,497 B1 * | 2/2002 | Penetrante ................. | 60/275 |
| 6,363,716 B1 * | 4/2002 | Balko et al. ............... | 60/286 |
| 6,716,398 B2 * | 4/2004 | Caren et al. ........... | 422/186.04 |
| 6,772,584 B2 * | 8/2004 | Chun et al. ............... | 60/275 |
| 6,959,538 B2 * | 11/2005 | Cho et al. ................. | 60/275 |
| 2005/0126159 A1 | 6/2005 | Cho | |

OTHER PUBLICATIONS

GM Patent U.S. Appl. No. 10/948,403, filed Sep. 23, 2004, entitled Plasma-Assisted NOx Reduction.
GM Patent U.S. Appl. No. 11/064,523, filed Feb. 23, 2005, entitled Destruction of Hydrocarbon Emissions.
GM Patent U.S. Appl. No. 11/141,969, filed Jun. 1, 2005, entitled Reforming Diesel Fuel for NOx Reduction.
GM Patent U.S. Appl. No. 11/155,179, filed Jun. 17, 2005, entitled Continuous Reforming of Diesel Fuel for NOx Reduction.

* cited by examiner

*Primary Examiner*—Binh Q. Tran

(57) ABSTRACT

The nitric oxide (NO) and nitrogen dioxide ($NO_2$) content of lean-burn engine exhaust is beneficially prepared for selective catalytic reduction (SCR) of these oxides to nitrogen by two sidestream additions to the exhaust. An ozone-containing air stream is added to the exhaust to affect oxidation of NO to $NO_2$. And a hydrocarbon(s) fuel constituent is added to a second humidified ozone-containing air stream and that mixture subjected to UV radiation. Strongly oxidizing hydroxyl radicals are formed by interaction of ozone, water, and UV radiation for reaction with the hydrocarbon. The resulting partially oxidized hydrocarbons (Pox) are added to the exhaust, providing effective reduction materials for the SCR of $NO_2$ to nitrogen and water.

10 Claims, 2 Drawing Sheets

$NO_x$ REDUCTION IN LEAN BURN ENGINE EXHAUST

TECHNICAL FIELD

This invention pertains to the reduction of nitrogen oxides, NOx, in the exhaust of a lean-burn engine such as a diesel engine. More specifically, this invention pertains to the formation and use of ozone and hydroxyl radicals to produce partially oxidized hydrocarbons for hydrocarbon-assisted selective catalytic reduction of $NO_2$ in the exhaust.

BACKGROUND OF THE INVENTION

Diesel engines and other lean-burn engines or power plants are operated at higher than stoichiometric air to fuel mass ratios for improved fuel economy. Such lean-burning engines produce a hot exhaust with a relatively high content of oxygen and nitrogen oxides ($NO_x$). The temperature of the exhaust from a warmed-up diesel engine is typically in the range of 200° C. to 400° C. and has a representative composition, by volume, of about 10-17% oxygen, 3% carbon dioxide, 0.1% carbon monoxide, 180 ppm hydrocarbons, 235 ppm $NO_x$ and the balance nitrogen and water. These $NO_x$ gases, typically comprising nitric oxide (NO) and nitrogen dioxide ($NO_2$), are difficult to reduce to nitrogen ($N_2$) because of the high oxygen ($O_2$) content in the hot exhaust stream.

Traditional three-way catalysts used with stoichiometric gasoline engines are not very effective for treating lean-burn exhaust. Researchers have attempted to find durable catalysts that can selectively reduce NOx using engine-out hydrocarbons (HC-SCR) despite the competing combustion reaction with the oxygen content of the exhaust. Such catalyst developments have not been successful because of poor activity, narrow operating temperature window and insufficient durability of candidate catalyst materials.

One of the hydrocarbon-utilizing technologies now being considered for the lean-burn gasoline or diesel engine NOx emission control is to reduce NOx using selected fuel-component hydrocarbons added to the exhaust stream. In one such approach, ozone is also added to the exhaust to promote the oxidation of NO to $NO_2$ and the exhaust with its added hydrocarbon and ozone is passed over a selective reduction catalyst comprising, for example, a dual bed of BaY zeolite (upstream bed) and CuY zeolite (downstream bed). In the oxidizing atmosphere of the exhaust stream some of the hydrocarbon species are partially oxidized to aldehydes or alcohols which promote the reduction of $NO_2$ when the stream passes in contact with the selective reduction catalyst.

The present specification describes a further and related improvement for more effective partial oxidation of added hydrocarbon for the selective catalytic reduction of NO and $NO_2$ in exhaust streams from lean-burn engines and power plants.

SUMMARY OF THE INVENTION

The exhaust of a diesel engine, one type of lean-burn engine, contains gaseous constituents, as stated above, and also particulate matter composed of carbon and incompletely burned hydrocarbons. The exhaust stream may be passed through a suitable filter or oxidation reactor before being subjected to selective catalytic reduction of NOx constituents.

Following any upstream filtration or oxidation treatment, two sidestream additions are made to the lean-burn engine exhaust before it flows into contact with the selective reduction catalyst. First, an ozone ($O_3$)-containing stream is introduced into the exhaust in an amount for oxidation of the NO constituent to $NO_2$. The ozone addition is followed by the addition of a stream of partially oxidized hydrocarbon species (sometimes referred to herein as Pox) as reductant materials for the reduction of $NO_2$ to $N_2$ and water.

An ozone-containing stream can be generated on a vehicle in the vicinity of the exhaust stream by blowing ambient air (usually moisture-containing air) through a commercial corona discharge ozone generator or through a non-thermal plasma reactor. The ozone generator is operated to produce an ozone-containing air stream for two different sidestream additions to the exhaust stream. A first stream of ozone-containing air is directly added to the exhaust for oxidation of NO to $NO_2$. A second stream of the moisture-containing and ozone-containing air is used in accordance with this invention to produce partially oxidized hydrocarbons such as formaldehyde, acetaldehyde, and other oxygen-containing hydrocarbon molecular species.

The second ozone-containing stream is conducted to a suitable flow-through vessel fitted with a source of ultraviolet radiation, such as 254 nanometer wavelength ultraviolet lamps. Hydrocarbon vapor, suitably derived from on-board fuel, is injected into the water-containing ozone stream upstream of the UV-radiation reactor vessel. An example of a suitable hydrocarbon is a fuel fraction-containing octanes. The complex mixture in air is exposed to the ultraviolet radiation (wave length of 254 nanometers) and hydroxyl radicals ($OH^\cdot$) are produced in the stream. Hydroxyl radical production is controlled to react with the hydrocarbon molecules to fragment them into smaller hydrocarbon moieties and oxidize the hydrocarbon fragments to oxygen-containing compounds such as formaldehyde, acetaldehyde, and/or lower molecular weight alcohols such as ethanol. This second stream, now containing partially oxidized hydrocarbons leaves the hydroxyl radical generator-reactor and enters the NOx-containing exhaust.

The hot exhaust stream then flows into contact with a suitable reduction catalyst to promote the reaction of the partially oxidized hydrocarbon species with nitrogen oxides, especially $NO_2$, to convert the nitrogen oxides to nitrogen and water.

An important feature of the invention is the generation and use of ultraviolet radiation on a mixture of ozone, water, and a hydrocarbon constituent to produce strongly oxidizing hydroxyl radicals in a relatively low temperature hydrocarbon-containing stream. The hydroxyl radicals and ozone cooperate to effectively produce partially oxidized hydrocarbon materials for the selective catalytic reduction of NOx, especially $NO_2$, in the exhaust of a lean-burn engine.

Other objects and advantages of the invention will become apparent from a description of preferred embodiments which follows.

The dashed lines connecting filled square data points show the amount of formaldehyde+acetaldehyde formed from 125 ppm octane with no UV radiation. The dashed lines connecting filled triangle data points show the amount of formaldehyde+acetaldehyde formed from 250 ppm octane with no UV radiation. The solid data lines report the complementary results when UV radiation is used to generate hydroxyl radicals in the ozone and octane-containing air streams.

Figure 2:
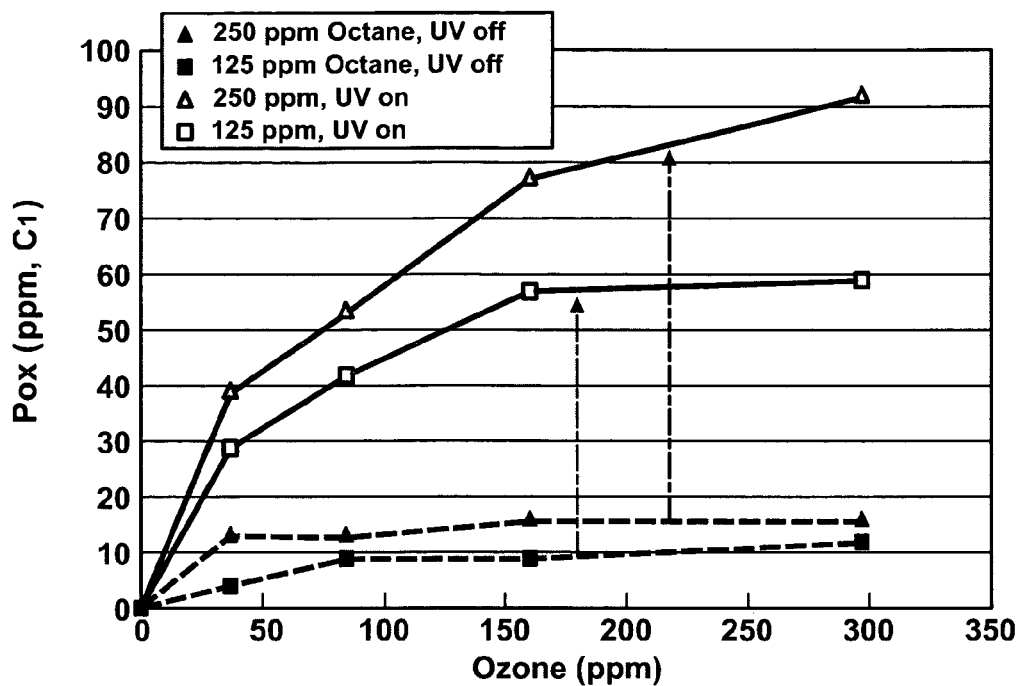
FIG. 2 is a graph with dashed data lines showing amounts of Pox produced (here formaldehyde+acetaldehyde) in air streams containing octane (125 ppm or 250 ppm) with increasing amounts of ozone (ppm) (UV off). The quantities of formaldehyde and acetaldehyde are determined and reported as $C_1$ carbon equivalents in ppm of the air stream. This graph also presents solid data lines showing the greater effect of increasing amounts of ozone and hydroxyl radicals (UV on) in producing formaldehyde+acetaldehyde from octane in the air stream.
Figure 3:
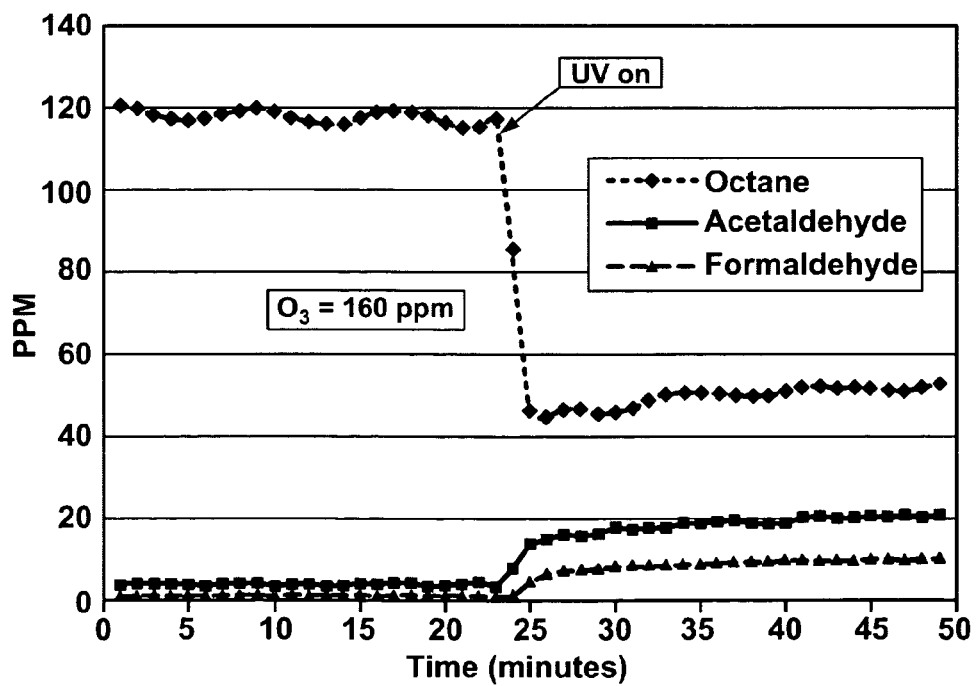

FIG. 3 presents data complementary to FIG. 2 showing the abrupt increase in the formation of formaldehyde (filled triangle data points) and acetaldehyde (filled square data points), each in ppm of the ozone-containing air stream (160 ppm ozone), with UV radiation turned on. FIG. 3 also shows the abrupt decline in the octane content (filled diamond data points) of the air stream from about 120 ppm when the UV radiation was turned on to generate hydroxyl radicals in the reactor-generator.

DESCRIPTION OF PREFERRED EMBODIMENTS

Lean-burn engines have the potential to significantly increase vehicle fuel economy and decrease carbon dioxide emissions. One of the major stumbling blocks in the commercial application of these engines is the lack of effective methods for the removal of NOx under the lean-burn condition. One approach to dealing with the NOx problem involves oxidizing NO (nitric oxide) in the exhaust gas stream to $NO_2$ (nitrogen dioxide) and then introducing partially oxidized hydrocarbons (Pox) into the exhaust gas stream. The Pox-$NO_2$ exhaust stream mixture can then be reacted over a suitable SCR (selective catalytic reduction) catalyst where the $NO_2$ is reduced to $N_2$, with concurrent oxidation of the Pox to $CO_2$ and $H_2O$. One method that has been suggested, and shows promise, is to oxidize NO and produce Pox by subjecting a side-stream of an air/fuel mixture, and possibly a portion of the engine exhaust, to a non-thermal plasma reactor which produces ozone and other reactive species. These reactive molecules will both oxidize the NO and create Pox, creating gas-phase species that will react over the SCR catalyst to remove NOx.

Ozone, the triatomic molecule of oxygen ($O_3$), has a high oxidation potential enabling it to oxidize NO to $NO_2$, and it has the potential to fragmentize and oxidize some hydrocarbon molecules to smaller hydrocarbon molecules and to oxygen-containing hydrocarbons such as relatively low molecular weight alcohols and aldehydes. These hydrocarbons are not fully oxidized to carbon dioxide and water. But only some hydrocarbons are susceptible to such partial oxidation by ozone.

Hydroxyl radicals (OH·) can be formed by the irradiation of ozone, in the presence of water vapor, with ultraviolet light at a wavelength of 254 nanometers (nm). The hydroxyl radical is extremely reactive due to the unpaired electron in its outermost electron shell. Because of this unstable configuration, hydroxyl radicals have a stronger oxidizing potential than ozone and quickly react with other molecules by oxidizing them. In accordance with this invention, hydroxyl radicals are used in combination with ozone to more effectively produce partially oxidized hydrocarbons for reduction of nitrogen oxides in the exhaust of a lean-burn engine. This process for partially oxidizing suitable hydrocarbons is controllable and may be tuned to produce useful concentrations of effective Pox molecules.

A general process for reducing nitrogen oxides in the exhaust gas of a lean-burn engine will be described with reference to FIG. 1, and then a process for producing hydroxyl radicals and partially oxidized hydrocarbon species will be illustrated.

A vehicle powered by a lean-burn combustion engine (diesel or gasoline fueled) produces an exhaust stream that contains oxygen, water, and a mixture of nitrogen oxides as described above in this specification. The mixture of nitrogen oxides largely comprises NO with some $NO_2$. The exhaust gasses from the cylinders of the engine are combined in a manifold and directed into one or more exhaust pipes or conduits that carry the exhaust to the rear of the vehicle. In the case of a diesel engine, the exhaust also contains particulate carbonaceous matter which may be removed from the exhaust by filtration or oxidation before the exhaust is treated in accordance with this invention.

In the use of presently known SCR catalysts it is preferred that the NO content of the exhaust stream be oxidized to $NO_2$ before the stream is passed into contact with the reduction catalyst.

Figure 1:
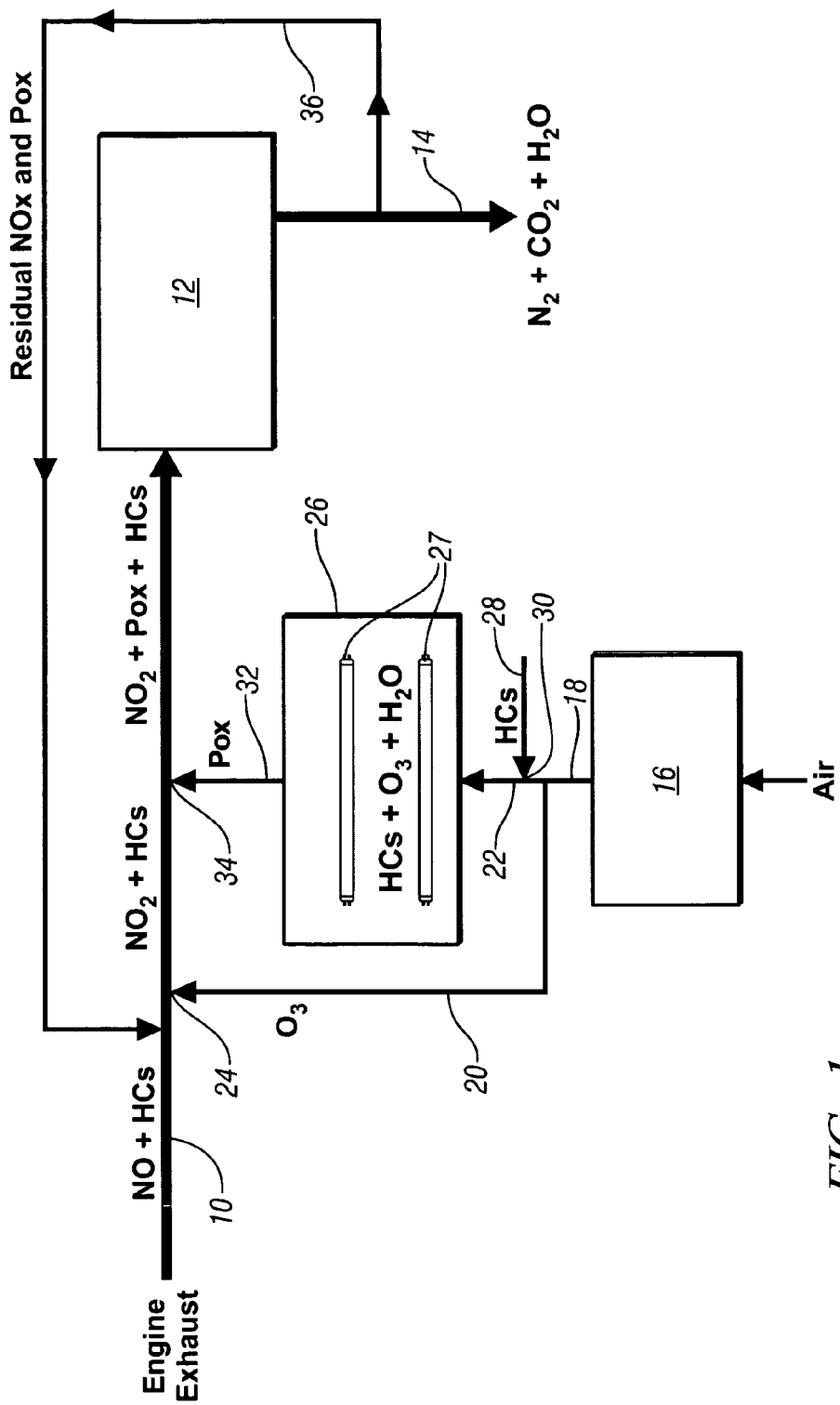
FIG. 1 is a schematic flow diagram of a method for treating hydrocarbons and nitrogen oxides, including NO and $NO_2$, in an exhaust stream from a lean burn engine. Ozone-containing air is produced in a corona discharge reactor and split into two streams. One stream is added to the NOx-containing exhaust to promote oxidation of NO to $NO_2$. A hydrocarbon fuel constituent is added to the second ozone-containing air stream and it is exposed to UV radiation in a hydroxyl radical generator-reactor chamber to generate partially oxidized hydrocarbons (Pox) that are added to the exhaust stream for downstream selective catalytic reduction of $NO_2$.

Referring to FIG. 1, exhaust stream 10 is ultimately conducted to a flow-through catalytic reactor 12 containing a suitable selective reduction catalyst. While exhaust stream 10 is typically composed as described above, it is labeled in FIG. 1 as containing NO+hydrocarbons (HCs) for illustrating the practice of the invention. The catalytic material(s) is typically dispersed as a washcoat on axial flow-through cell walls of an extruded ceramic monolithic catalyst carrier. In the case of a dual bed selective reduction catalyst, one catalyst (such as BaY zeolite) is usually carried on an upstream monolith and a second catalyst (such as CuY zeolite) carried on a downstream monolith, both contained in a high temperature resistant metal container of reactor 12.

Much of the treated gas stream 14 leaving catalytic reactor 12 is discharged to the atmosphere, although a portion of stream 14 may be recycled as will be described. However, in accordance with this invention, at least two side streams are added to exhaust stream 10 before it reaches catalytic reactor 12.

A suitable flow-through ozone generator 16 is carried on the vehicle so as to be protected (for example, at least thermally insulated) from the pipe carrying the hot exhaust stream 10. Ozone generator 16, which may, for example, be a corona discharge device or a non-thermal plasma generator, is suitably powered by the vehicle's electrical system. A stream of ambient air from the operating vehicle environment is blown through ozone generator 16, by means not illustrated in FIG. 1. Ozone generator 16 is sized and powered to produce sufficient ozone from the oxygen content of the air for the practice of this invention. Ozone-containing air stream 18 leaving the ozone generator 16 is divided into a first ozone-containing stream 20 and a second ozone-containing stream 22.

First ozone-containing stream 20 is conducted to, and added into, exhaust stream 10 at location 24. Ozone stream 20, initially at ambient temperature, mixes with the hot exhaust stream 10 and commences oxidation of the NO content of exhaust stream 10 to $NO_2$. Thus, exhaust stream 10 downstream of the admission point 24 of ozone stream 20 is labeled $NO_2$+HCs.

A hydrocarbon constituent in liquid or vapor form (stream 28, labeled HCs) is injected into the second ozone-containing air stream 22 at stream location 30. The hydrocarbon material is suitably a constituent of the fuel used in the lean-burn operated engine. Thus, the hydrocarbon may, for example, be obtained from the vapor space of a gasoline tank or diesel fuel tank. The hydrocarbon material may comprise, for example $C_5$ to $C_9$ hydrocarbons and may include alcohol, such as but not limited to ethanol, where it has been blended with the fuel. Indeed, for the practice of this invention, ethanol is considered a suitable "hydrocarbon" additive to ozone-containing stream 22. The second ozone-containing stream 22, including its vapor or gas phase hydrocarbon material, is conducted to a hydroxyl radical/Pox generator-reactor 26. Since ozone-containing stream 22 started with humid ambient air it also contains water which is necessary for the formation of hydroxyl radicals. In the event that the ambient air is not sufficiently humid, water is added to stream 22 at this time.

This ozone/fuel vapor/water-containing air stream 22 is then subjected to UV light in the 254 nm wavelength range in the generator-reactor 26. Generator-reactor 26 comprises a flow-through chamber containing a suitable number of UV lamps 27 to provide UV wavelength electromagnetic energy to stream 22. Generator-reactor 26 is also sized and shaped to permit a suitable space velocity of stream 22 such that the ozone-water mixture produces hydroxyl radicals. The hydroxyl radical/ozone mixture immediately reacts with the hydrocarbons in the stream to produce the necessary partially oxidized hydrocarbons. These Pox materials are carbon-hydrogen-oxygen containing molecules such as formaldehyde, acetaldehyde, and ethanol and higher molecular weight alcohols.

The outlet stream 32 (labeled Pox) from the generator-reactor 26 (still at about ambient temperature) is injected into the hot exhaust stream 10 at location 34. Downstream of Pox injection point 34, exhaust stream 10 is labeled as $NO_2$+Pox+HCs, reflecting its adjusted composition. The $NO_2$ and Pox and hydrocarbon-containing exhaust stream 10 then passes through the SCR catalyst reactor 12.

As exhaust stream 10 passes through catalytic reactor 12 at a suitable space velocity, $NO_2$ is reduced by Pox producing $N_2$ with concurrent oxidation of the Pox to $CO_2$ and $H_2O$. The ozone generator 16 has variable output, and the UV radiation intensity in generator-reactor 26 can be increased or decreased by changing the number of UV lamps 27 activated. In this manner, the hydroxyl radical production, and subsequently the Pox production can be tuned for optimum performance.

Stream 14 leaving catalytic reactor 12 and discharged to the atmosphere comprises mostly nitrogen, oxygen, carbon dioxide, and water. But it may contain small amounts of Pox, hydrocarbons, and/or NOx. Accordingly, a portion, or portions, of stream 14 may be recycled to different locations in the exhaust treatment system utilized in the practice of this invention. For example, as illustrated in FIG. 1, a portion (stream 36) of the post-catalyst exhaust stream 14 is recycled into the exhaust stream 10 upstream of the ozone stream addition location 24 to enhance NOx removal.

In a second embodiment of the invention not illustrated in FIG. 1, a combination of a fuel side stream 28 and a portion of the post-catalyst exhaust stream 14 is passed through the ozone generator 16, and then injected into the generator-reactor 26 to produce Pox, followed by mixing with the engine exhaust stream 10 at location 34 before the exhaust stream 10 enters catalytic reactor 12.

In a third embodiment of the invention not illustrated in FIG. 1, a portion of the post-catalyst exhaust stream 14 (without a fuel side-stream) is passed through the ozone generator 16, and then fed to the generator-reactor 26 to produce the Pox, followed by mixing with the engine exhaust stream 10 at location 34, before catalytic reduction of $NO_2$ with Pox over the selective reduction catalyst.

Construction and Performance of a Hydroxyl Radical Generator-Reactor

A hydroxyl radical generator and reactor system for partial oxidation of hydrocarbons was built. A stream of compressed oxygen was passed through an Azcozon model #HTU500DG2S corona discharge ozone generator (Azco Industries Limited, Surrey, B.C., Canada). Compressed ambient air from a central supply was passed over water in a closed vessel to humidify it. In this illustration, octane(s) was used as the hydrocarbon constituent. Octane vapor was injected into the humidified air stream by a syringe pump and the octane evaporated in the stream.

These two streams, an ozone-containing, oxygen stream, and an octane-containing, humid air stream, were then combined and passed serially into two glass cylinders which served as the hydroxyl radical generator-reactor chambers. Each glass cylinder measured approximately 41.3 cm in length with an internal diameter of 10.2 cm, resulting in a nominal internal volume of 3.4 L. Each cylinder was fitted with a custom-made stainless steel end plate into which holes were drilled and Viton® O-rings inserted. The ends of three 15 watt 254 nm UV lamps (#A-09815-59, Cole-Parmer Instrument Co., Vernon Hills, Ill.) were inserted and formed airtight seals with the O-rings when lubricated with Teflon® grease. An additional hole was drilled in each end cap and a stainless steel coupling welded in place so that Teflon® fittings could be attached to allow for the inflow and outflow of the gases. A Teflon® elbow was placed onto the couplings on the inner side of the end caps so that the gases would enter and exit the chamber perpendicular to the length of the pipe in order to make the flow turbulent rather than laminar. Both generator-reactor chambers were covered with aluminum foil to protect the operator's eyes from the UV light.

A portion of the gases exiting the second chamber were sampled by a flame ionization detector (FID) (Signal Model 3000 HM, Signal Instrument Co., Ltd., Surrey, England) after passing through a catalytic ozone destroyer, to determine the amount of hydrocarbons present. The hydroxyl radical generator-reactor exhaust stream could also be sampled by a UV absorption ozone analyzer capable of measuring ozone concentrations of 0-2000 ppm (Model IN-2000, IN USA, Inc., Needham, Mass.). In some experiments, the generator-reactor exhaust was analyzed using a Fourier Transform Infrared (FTIR) Spectrometer (Model Nexus 670, Thermo Nicolet, Waltham, Mass.). The FTIR spectra were measured using a liquid nitrogen cooled MCT detector and a 2 m gas cell operated at 165° C. (16 scans, 0.5 $cm^{-1}$ resolution). In some instances, the data were acquired through a notebook computer using Lab View data acquisition software (National Investment Corp., Austin, Tex.).

A series of experiments were conducted to demonstrate the operation and efficiency of UV radiation generated hydroxyl radicals (as produced in the above generator-reactor) in the partial oxidation of a mixture of octanes. In the experiments octane was added to the generator-reactor in amounts of 125 ppm or 250 ppm in the flowing oxygen stream. Ozone was generated in the oxygen stream in amounts varying up to 300 ppm. The air stream contained sufficient water to react with available ozone in the production of hydroxyl radicals by the overall reaction:

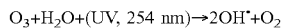

$$O_3 + H_2O + (UV, 254\ nm) \rightarrow 2OH^{\cdot} + O_2$$

The above equation summarizes a sequence of reactions in which the UV radiation interacts with ozone molecules to form oxygen radicals and oxygen molecules. The oxygen radicals react with water molecules to form hydroxyl radicals. The hydroxyl radicals then react with octane molecules to form carbon-hydrogen-oxygen molecule-containing species, Pox.

It is found that the presence of ozone alone will form relatively small quantities of Pox from octane. Small quantities of formaldehyde and acetaldehyde were produced. But the hydroxyl radicals markedly increased the yield of these partially oxidized hydrocarbons.

FIG. 2 is a graph showing the effect of increasing amounts of ozone (from 0 to 300 ppm in water-containing and octane-containing air streams) in producing formaldehyde and acetaldehyde (Pox). Octane was added at either 125 ppm or 250 ppm. The experiments were conducted using the above described hydroxyl radical generator-reactor system. When the UV lamps were turned on, both ozone and hydroxyl radicals participated in the partial oxidation of octane. When the UV bulbs were off, only ozone was available for the oxidation reaction.

In FIG. 2, the dashed lines connecting filled square data points show the amount of formaldehyde+acetaldehyde (determined as $C_1$ carbon equivalents in ppm of the air stream) formed from 125 ppm octane with no UV radiation. The dashed lines connecting filled triangle data points show the amount of formaldehyde+acetaldehyde (determined as $C_1$ carbon equivalents in ppm of the air stream) formed from 250 ppm octane with no UV radiation. In each set of these UV off experiments ozone was the sole oxidant. It is seen that the total production of Pox as $C_1$ equivalents was less than about 16 ppm in the air stream.

In FIG. 2 the solid data lines connecting filled square data points and filled triangle data points, which are complementary to the dashed data lines, show the markedly increased production of Pox from octane with the UV radiation turned on and generating hydroxyl radicals to strongly augment the oxidizing effect of ozone. When the ozone level reached about 160 ppm with 125 ppm octane, the Pox level reached nearly 60 ppm. And when the ozone level reached about 160 ppm with 250 ppm octane, the Pox level reached about 76 ppm and increased with increasing amounts of ozone and hydroxyl radicals. While formaldehyde and acetaldehyde were specifically identified and measured in the outlet of the hydroxyl radical generator, other partially oxidized hydrocarbons were produced from the octane.

FIG. 3 presents data complementary to FIG. 2 showing the abrupt increase in the formation of formaldehyde (filled triangle data points) and acetaldehyde (filled square data points) each in ppm of the ozone-containing air stream (160 ppm ozone) when the UV radiation was turned on. FIG. 3 also shows the abrupt decline in the octane content (filled diamond data points) of the air stream from about 120 ppm when the UV radiation was turned on to generate hydroxyl radicals in the reactor-generator.

The practice of the invention thus uses the addition of two side streams to the exhaust of a lean-burn engine to improve the selective catalytic reduction of nitrogen oxides in the exhaust stream. Ambient air (humid ambient air) is passed through an ozone generator and a portion of the resulting ozone-containing stream is added to the exhaust stream to promote the oxidation of NO to $NO_2$. Another portion of the ozone-containing stream is mixed with a hydrocarbon fuel constituent and subjected to UV radiation to produce hydroxyl radicals from the ozone and water. The strongly oxidizing hydroxyl radicals complement the oxidizing effect of the ozone to produce partially oxidized hydrocarbon species in this second air stream. The Pox-containing stream is added to the engine exhaust to provide reductant species for $NO_2$ as the exhaust flows into contact with a suitable selective reduction catalyst.

The invention has been illustrated by certain preferred examples but the scope of the invention is not limited to the illustrated embodiments.

The invention claimed is:

1. A method of reducing nitrogen oxides, including NO and $NO_2$, in an exhaust stream from a lean-burn combustion source, the method comprising:
    adding a quantity of hydrocarbon to a water-containing and ozone-containing stream of air;
    exposing the stream of air to ultraviolet radiation of a wavelength selected to induce the formation of hydroxyl radicals in the stream, the hydroxyl radicals reacting with the hydrocarbon to form hydrogen-carbon-oxygen-containing molecules in the air stream; and
    adding the air stream to the exhaust wherein the hydrogen-carbon-oxygen-containing molecules are available as reductants for $NO_2$.

2. A method of reducing nitrogen oxides as recited in claim 1 in which the lean-burn combustion source is a diesel-fuelled engine and the hydrocarbon is diesel fuel or a hydrocarbon-containing fraction of diesel fuel.

3. A method of reducing nitrogen oxides as recited in claim 1 in which the lean-burn combustion source is a gasoline-fuelled engine and the hydrocarbon is gasoline or a hydrocarbon-containing fraction of gasoline.

4. A method of reducing nitrogen oxides as recited in claim 1 in which the wavelength of the UV radiation is about 254 nanometers.

5. A method of reducing nitrogen oxides, including NO and $NO_2$, in an exhaust stream from a lean-burn engine powered automotive vehicle, the method comprising:
    adding a stream of ozone-containing air to the exhaust at a first location in the flow path of the exhaust to oxidize at least a portion of the NO content to $NO_2$;
    subjecting a mixture of water, ozone, and a hydrocarbon to electromagnetic radiation of ultraviolet wavelength to form hydroxyl radicals, wherein the hydroxyl radicals and ozone react with the hydrocarbon to form hydrogen-carbon-oxygen-containing molecules in the air;
    adding the air and hydrogen-carbon-oxygen-containing molecules to the exhaust stream at a second location in the flow path of the exhaust wherein the hydrogen-carbon-oxygen-containing molecules are available as reductants for $NO_2$; and, thereafter
    passing the exhaust stream into contact with a catalyst for reduction of $NO_2$ to nitrogen utilizing the hydrogen-carbon-oxygen-containing molecules.

6. A method of reducing nitrogen oxides as recited in claim 5 in which the lean-burn combustion source is a diesel-fueled engine and the hydrocarbon is diesel fuel or a hydrocarbon-containing fraction of diesel fuel.

7. A method of reducing nitrogen oxides as recited in claim 5 in which the lean-burn combustion source is a gasoline-fueled engine and the hydrocarbon is gasoline or a hydrocarbon-containing fraction of gasoline.

8. A method of reducing nitrogen oxides as recited in claim 5 in which the wavelength of the UV radiation is about 254 nanometers.

9. A method of reducing nitrogen oxides as recited in claim 5 in which second location in the flow path of the exhaust stream is downstream of the first location.

10. A method of reducing nitrogen oxides, including NO and $NO_2$, in an exhaust stream from a lean-burn engine powered automotive vehicle, the method comprising:

flowing a stream of moisture-containing ambient air through a flow-through ozone generator on the vehicle to produce a stream of moisture and ozone-containing air exiting the ozone generator;

dividing the exiting stream into a first and second flowing streams;

adding the first stream of ozone-containing air to the exhaust at a first location in the flow path of the exhaust to oxidize at least a portion of the NO content to $NO_2$;

adding hydrocarbon material to the second flowing ozone-containing air stream, the hydrocarbon being vaporizable in the stream;

subjecting the hydrocarbon-containing second stream to electromagnetic radiation of ultraviolet wavelength to form hydroxyl radicals, wherein the hydroxyl radicals and ozone react with the hydrocarbon to form hydrogen-carbon-oxygen-containing molecules in the air;

adding the second stream with its hydrogen-carbon-oxygen-containing molecules to the exhaust stream at a second location in the flow path of the exhaust wherein the hydrogen-carbon-oxygen-containing molecules are available as reductants for $NO_2$; and, thereafter passing the exhaust stream into contact with a catalyst for reduction of $NO_2$ to nitrogen utilizing the hydrogen-carbon-oxygen-containing molecules.

* * * * *